(12) United States Patent
Fadhel et al.

(10) Patent No.: US 11,724,943 B2
(45) Date of Patent: *Aug. 15, 2023

(54) BLACK POWDER CATALYST FOR HYDROGEN PRODUCTION VIA DRY REFORMING

(71) Applicant: Saudi Arabian Oil Company, Dhahran (SA)

(72) Inventors: Bandar A. Fadhel, Dhahran (SA); Mohammed A. Albuali, Dammam (SA); Rami Bamagain, Khobar (SA); Ahmad A. Wedhaya, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 76 days.

This patent is subject to a terminal disclaimer.

(21) Appl. No.: 17/140,245

(22) Filed: Jan. 4, 2021

(65) Prior Publication Data

US 2022/0212949 A1 Jul. 7, 2022

(51) Int. Cl.
| | |
|---|---|
| *B01J 23/745* | (2006.01) |
| *B01J 37/08* | (2006.01) |
| *B01J 37/18* | (2006.01) |
| *C01B 3/40* | (2006.01) |
| *C01G 49/06* | (2006.01) |

(52) U.S. Cl.
CPC ............ *C01G 49/06* (2013.01); *B01J 23/745* (2013.01); *B01J 37/08* (2013.01); *B01J 37/18* (2013.01); *C01B 3/40* (2013.01)

(58) Field of Classification Search
CPC .......... B01H 23/745; C01B 3/40; C01G 49/06
See application file for complete search history.

(56) References Cited

U.S. PATENT DOCUMENTS

| | | | |
|---|---|---|---|
| 106,836 A | 8/1870 | Kuhlmann | |
| 665,346 A | 1/1901 | Reed | |
| 701,987 A | 6/1902 | Alz | |
| 978,576 A | 12/1910 | Goodell | |
| 2,378,905 A | 6/1945 | Bates | |
| 2,527,846 A * | 10/1950 | Phinney | C07C 1/046 518/703 |
| 2,614,066 A | 10/1952 | Cornell | |
| 2,910,426 A | 10/1959 | Gluesenkamp | |
| 3,288,692 A | 11/1966 | Leduc | |
| 3,409,540 A | 11/1968 | Gould et al. | |

(Continued)

FOREIGN PATENT DOCUMENTS

| | | | |
|---|---|---|---|
| CA | 2938299 | 5/2015 | |
| CN | 105861083 A * | 8/2016 | ............... C10L 3/00 |

(Continued)

OTHER PUBLICATIONS

Machine translation of Ogawa (JP2016/155702A), Sep. 1, 2016.*

(Continued)

*Primary Examiner* — Jun Li

(74) *Attorney, Agent, or Firm* — Fish & Richardson P.C.

(57) ABSTRACT

A dry reforming catalyst that includes treated black powder (primarily hematite), and a method of treating black powder (e.g., from a natural gas pipeline) to give the treated black powder. A dry reformer having the treated black powder as reforming catalyst, and a method of producing syngas with the dry reformer.

11 Claims, 6 Drawing Sheets

(56) References Cited

U.S. PATENT DOCUMENTS

| | | |
|---|---|---|
| 3,427,235 A | 2/1969 | Leduc |
| 3,527,834 A | 9/1970 | Kehl et al. |
| 3,533,938 A | 10/1970 | Arnold |
| 3,585,217 A | 6/1971 | Titzenthaler |
| 3,632,497 A | 1/1972 | Leduc |
| 3,702,292 A | 11/1972 | Burich |
| 3,726,789 A | 4/1973 | Kovach |
| 3,755,143 A | 8/1973 | Hosoi et al. |
| 3,856,659 A | 12/1974 | Owen |
| 3,894,059 A | 7/1975 | Selvaratnam |
| 4,064,062 A | 12/1977 | Yurko |
| 4,090,949 A | 5/1978 | Owen et al. |
| 4,119,507 A | 10/1978 | Simmrock et al. |
| 4,134,824 A | 1/1979 | Kamm et al. |
| 4,230,551 A | 10/1980 | Salyer et al. |
| 4,264,435 A | 4/1981 | Read et al. |
| 4,297,203 A | 10/1981 | Ford et al. |
| 4,310,501 A | 1/1982 | Reh et al. |
| 4,329,208 A | 5/1982 | Vayenas et al. |
| 4,332,663 A | 6/1982 | Berneke |
| 4,426,276 A | 1/1984 | Dean et al. |
| 4,434,031 A | 2/1984 | Horowitz et al. |
| 4,522,802 A | 6/1985 | Setzer et al. |
| 4,527,003 A | 7/1985 | Okamoto et al. |
| 4,560,451 A | 12/1985 | Nielsen |
| 4,587,011 A | 5/1986 | Okamoto et al. |
| 4,602,986 A | 7/1986 | Ellis et al. |
| 4,655,904 A | 4/1987 | Okamoto et al. |
| 4,725,349 A | 2/1988 | Okamoto et al. |
| 4,735,728 A | 4/1988 | Wemhoff |
| 4,761,394 A | 8/1988 | Lauritzen |
| 4,786,400 A | 11/1988 | Farnsworth |
| 4,830,728 A | 5/1989 | Herbat et al. |
| 4,992,160 A | 2/1991 | Long et al. |
| 5,012,360 A | 4/1991 | Yamauchi et al. |
| 5,091,351 A | 2/1992 | Murakawa et al. |
| 5,108,581 A | 4/1992 | Aldridge |
| 5,527,436 A | 6/1996 | Cooker et al. |
| 5,601,937 A | 2/1997 | Isenberg |
| 5,624,493 A | 4/1997 | Wagh et al. |
| 5,904,837 A | 5/1999 | Fujiyama |
| 5,906,728 A | 5/1999 | Iaccino et al. |
| 5,951,850 A | 9/1999 | Ino et al. |
| 6,033,555 A | 3/2000 | Chen et al. |
| 6,084,142 A | 7/2000 | Yao et al. |
| 6,190,533 B1 | 2/2001 | Bradow et al. |
| 6,210,562 B1 | 4/2001 | Xie et al. |
| 6,280,593 B1 | 8/2001 | Wiese et al. |
| 6,293,979 B1 | 9/2001 | Choudhary et al. |
| 6,312,658 B1 | 11/2001 | Hufton et al. |
| 6,319,864 B1 | 11/2001 | Hannigan et al. |
| 6,336,791 B1 | 1/2002 | O'Toole |
| 6,531,515 B2 | 3/2003 | Moore, Jr. et al. |
| 6,656,346 B2 | 12/2003 | Ino et al. |
| 6,743,961 B2 | 6/2004 | Powers |
| 6,849,356 B2 | 2/2005 | Dow et al. |
| 6,979,757 B2 | 12/2005 | Powers |
| 7,019,187 B2 | 3/2006 | Powers |
| 7,045,554 B2 | 5/2006 | Raje et al. |
| 7,132,042 B2 | 11/2006 | Genetti et al. |
| 7,241,401 B2 | 7/2007 | Aasberg-Petersen et al. |
| 7,302,795 B2 | 12/2007 | Vetrovec |
| 7,374,664 B2 | 5/2008 | Powers |
| 7,378,561 B2 | 5/2008 | Olah et al. |
| 7,396,449 B2 | 7/2008 | Powers |
| 7,404,889 B1 | 7/2008 | Powers |
| 7,419,584 B2 | 9/2008 | Stell et al. |
| 7,460,333 B2 | 12/2008 | Akamatsu et al. |
| 7,550,642 B2 | 6/2009 | Powers |
| 7,592,290 B2 | 9/2009 | Hussain et al. |
| 7,642,292 B2 | 1/2010 | Severinsky |
| 7,744,747 B2 | 6/2010 | Halsey |
| 7,858,834 B2 | 12/2010 | Powers |
| 7,906,559 B2 | 3/2011 | Ohlah et al. |
| 7,951,283 B2 | 5/2011 | Stoots et al. |
| 7,972,498 B2 | 7/2011 | Buchanan et al. |
| 7,973,087 B2 | 7/2011 | Kibby et al. |
| 8,075,746 B2 | 12/2011 | Hartvigsen et al. |
| 8,152,973 B2 | 4/2012 | Yamamoto et al. |
| 8,198,338 B2 | 6/2012 | Shulenberger et al. |
| 8,287,716 B2 | 10/2012 | Al-Sadah |
| 8,303,917 B2 | 11/2012 | Miyashiro et al. |
| 8,304,567 B2 | 11/2012 | Kadota et al. |
| 8,628,668 B2 | 1/2014 | Simonson |
| 8,747,698 B2 | 6/2014 | Johanning et al. |
| 8,771,637 B2 | 7/2014 | Wynn et al. |
| 8,816,137 B2 | 8/2014 | Ohlah et al. |
| 8,845,940 B2 | 9/2014 | Niven et al. |
| 8,951,333 B2 | 2/2015 | Cabourdin et al. |
| 9,085,497 B2 | 7/2015 | Jennings |
| 9,090,543 B2 | 7/2015 | Schoedel et al. |
| 9,096,806 B2 | 8/2015 | Abba et al. |
| 9,115,070 B2 | 8/2015 | Pazicky et al. |
| 9,175,409 B2 | 11/2015 | Sivasankar et al. |
| 9,221,027 B2 | 12/2015 | Kuppler et al. |
| 9,242,230 B2 | 1/2016 | Moon et al. |
| 9,255,230 B2 | 2/2016 | Shafi et al. |
| 9,260,366 B2 | 2/2016 | Verhaak et al. |
| 9,279,088 B2 | 3/2016 | Shafi et al. |
| 9,284,497 B2 | 3/2016 | Bourane et al. |
| 9,284,502 B2 | 3/2016 | Bourane et al. |
| 9,296,961 B2 | 3/2016 | Shafi et al. |
| 9,303,323 B2 | 4/2016 | DiMascio et al. |
| 9,312,454 B2 | 4/2016 | Itoh et al. |
| 9,328,035 B1 | 5/2016 | Kuhn et al. |
| 9,435,404 B2 | 9/2016 | Goleski et al. |
| 9,555,367 B2 | 1/2017 | Masel et al. |
| 9,559,375 B2 | 1/2017 | Savinell et al. |
| 9,618,264 B1 | 4/2017 | Berdut-Teruel |
| 9,634,343 B2 | 4/2017 | Munier et al. |
| 9,675,979 B2 | 6/2017 | Hassell |
| 9,752,080 B2 | 9/2017 | Christensen et al. |
| 9,884,313 B2 | 2/2018 | Shen et al. |
| 9,963,392 B2 | 5/2018 | Deo et al. |
| 9,970,804 B2 | 5/2018 | Khousa et al. |
| 9,973,141 B2 | 5/2018 | Hammad et al. |
| 10,179,733 B2 | 1/2019 | Becker et al. |
| 10,252,243 B2 | 4/2019 | Fadhel et al. |
| 10,252,909 B2 | 4/2019 | Lofberg et al. |
| 10,329,676 B2 | 6/2019 | Kaczur et al. |
| 10,357,759 B2 | 7/2019 | D'Souza et al. |
| 10,422,754 B2 | 9/2019 | Al Hosani et al. |
| 2005/0211603 A1 | 9/2005 | Guillaume et al. |
| 2006/0171065 A1 | 8/2006 | Akamatsu et al. |
| 2008/0011644 A1 | 1/2008 | Dean |
| 2008/0011645 A1 | 1/2008 | Dean |
| 2008/0083648 A1 | 4/2008 | Bishop et al. |
| 2008/0194900 A1 | 8/2008 | Bhirud |
| 2008/0277314 A1 | 11/2008 | Halsey |
| 2008/0283445 A1 | 11/2008 | Powers |
| 2009/0050523 A1 | 2/2009 | Halsey |
| 2010/0089795 A1 | 4/2010 | Fujiyama et al. |
| 2010/0137458 A1 | 6/2010 | Erling |
| 2011/0083996 A1 | 4/2011 | Shafi et al. |
| 2011/0132770 A1 | 6/2011 | Sala et al. |
| 2011/0247500 A1 | 10/2011 | Akhras et al. |
| 2013/0129610 A1 | 5/2013 | Kale |
| 2013/0195750 A1* | 8/2013 | Koyanaka ............ B01J 37/035 502/324 |
| 2013/0220884 A1 | 8/2013 | Bourane et al. |
| 2013/0233766 A1 | 9/2013 | Shafi et al. |
| 2013/0248419 A1 | 9/2013 | Abba |
| 2015/0225295 A1 | 8/2015 | Mcandlish et al. |
| 2015/0337445 A1 | 11/2015 | Hasegawa et al. |
| 2015/0343416 A1 | 12/2015 | Fadhel et al. |
| 2016/0002035 A1 | 1/2016 | Ralston et al. |
| 2016/0264886 A1 | 9/2016 | Davydov |
| 2016/0333487 A1 | 11/2016 | Rodriguez |
| 2017/0050845 A1 | 2/2017 | Lofberg et al. |
| 2017/0292197 A1 | 10/2017 | Lei et al. |

(56) References Cited

U.S. PATENT DOCUMENTS

| | | |
|---|---|---|
| 2019/0032228 A1 | 1/2019 | Krause et al. |
| 2019/0194074 A1 | 6/2019 | Amr et al. |

FOREIGN PATENT DOCUMENTS

| | | | | |
|---|---|---|---|---|
| CN | 104923234 | | 12/2017 | |
| JP | 2009227497 A | * | 10/2009 | ............... C04B 5/06 |
| JP | 2014062038 A | * | 4/2014 | |
| JP | 2016155702 A | * | 9/2016 | |
| WO | WO-9745564 A1 | * | 12/1997 | ......... C21B 13/0033 |
| WO | WO 2000009633 | | 2/2000 | |
| WO | WO 2003062141 | | 7/2003 | |
| WO | WO 2009073436 | | 6/2009 | |
| WO | WO 2010009077 | | 1/2010 | |
| WO | WO 2010009082 | | 1/2010 | |
| WO | WO 2010009089 | | 1/2010 | |
| WO | WO 2010143783 | | 12/2010 | |
| WO | WO 2015128045 | | 9/2013 | |
| WO | WO 2014160168 | | 10/2014 | |
| WO | WO 2015183200 | | 12/2015 | |
| WO | WO 2016207892 | | 12/2016 | |
| WO | WO 2019112555 | | 6/2019 | |

OTHER PUBLICATIONS

Machine translation of JP 2014062038, publication date Apr. 10, 2014.*
Machine translation of JP 2009227497, publication date Oct. 8, 2009.*
Machine translaion of CN 105861083A, publication date Aug. 17, 2016.*
Satyendra (Steelmaking slag, Ispat Digest, Apr. 12, 2013).*
U.S. Appl. No. 16/899,254, Fadhel et al., filed Jun. 11, 2020.
"Hydrogen and Oxygen production via electrolysis powered by renewable energies to reduce environmental footprint of a WWTP.," Greenlysis, www.life-greenlysis.eu 2010-2012, 16 pages.
Albrecht et al., "Unexpectedly efficient CO2 hydrogenation to higher hydrocarbons over non-doped Fe2O3," Appl. Catal., B, May 2017, 204: 119-126.
Beurden, "On the catalytic aspects of steam-methane reforming," Energy Research Centre of the Netherlands (ECN), Technical Report I-04-003, Dec. 2004, 27 pages.
Bhuiyan, "Metathesis of Butene to Produce Propylene over Mesoporous Tungsten Oxide Catalyst: Synthesis, Characterization and Kinetic Modeling," a Thesis Presented to the Deanship of Graduate Studies, King Fahd University of Petroleum and Minerals, Dhahran, Saudi Arabia, in Partial Fulfillment of the Requirements for the Degree of Mast of Science in Chemical Engineering, Jun. 2013, 188 pages.
Bidrawn et al., "Efficient Reduction of CO2 in a Solid Oxide Electrolyzer," Electrochemical and Solid-State Letters, II, B167-B170, reprinted from Penn Libraries, 2008, 6 pages.
Chew et al., "Effect of nitrogen doping on the reducibility, activity and selectivity of carbon nanotube-supported iron catalysts applied in CO2 hydrogenation," Appl. Catal., A, Jul. 2014, 482: 163-170.
Choi et al., "Carbon dioxide Fischer-Tropsch synthesis: A new path to carbon-neutral fuels," Appl. Catal., B, Mar. 2017, 202: 605-610.
Choi et al., "Hydrogenation of carbon dioxide over alumina supported Fe-K catalysts," Catalysis Letters, Mar. 1996, 40: 115-118.
Cowie et al., "Naturally occurring radioactive material and naturally occurring mercury assessment of black powder in sales gas pipelines," Radiation Protection and Environment, 42:1-2, Jan.-Mar. & Apr.-Jun. 2019, 6 pages.
Crammer et al., "The Mechanism of Isomerization of Olefins with transition metal catalysts," Journal of the American Chemical Society, Mar. 1966, 88(15): 3534-3544.
Dinesh et al., "Iron-based flow batteries to store renewable energies," Environmental Chemistry Letters, Feb. 2018, 12 pages.
Ding et al., "CO2 Hydrogenation to Hydrocarbons over Iron-Based Catalyst: Effects of Physico-Chemical Properties of Al2O3 Supports," Ind. Eng. Chem. Res., 2014, 53(45): 17563-17569.
Du et al., "Sodium Hydroxide Production from Seawater Desalination Brine: Process Design and Energy Efficiency," Environ.Sci. Technol, 52, 5949-5958, 2018, 10 pages.
Fang et al., "A Nanomesoporous Catalyst from Modifier Red Mud and Its Application for Methane Decomposition to Hydrogen Production," Article ID 6947636, Hindawi Publishing Corporation, Journal of Nanomaterials, 2016, 8 pages.
Godoy et al., "210Pb content in natural gas pipeline residues ("black-powder") and its correlation with the chemical composition," Journal of Environmental Radioactivity 83 (2005) 101e111, 12 pages.
Gräfe et al., "Bauxite residue issues: IV. Old obstacles and new pathways for in situ residue bioremediation," Hydrometallurgy, 2011, 108: 46-59.
Hu et al., "Hydrothermally stable MOFs for CO2 hydrogenation over iron-based catalyst to light olefins," J. CO2 Util., 2016, 15, 89-95.
Hua et al., "Transformation of 2-Butene into Propene on WO3/MCM-48: Metathesis and Isomerization of n-Butene," Catalysts, 2018, 8:585, 11 pages.
Kurtoglu and Uzun, "Red Mud as an Efficient, Stable, and Cost-Free Catalyst for Cox-Free Hydrogen Production from Ammonia," Scientific Reports, 2016, 6:32279, 8 pages.
Lee et al., "Selective Positional Isomerization of 2-Butene over Alumina and La-promoted Alumina Catalysts". J. Ind. Eng. Chem., 2007, 13(7): 1062-1066, 5 pages.
Liu et al., "Fe-MOF-derived highly active catalysts for carbon dioxide hydrogenation to valuable hydrocarbons," J. CO2 Util., Oct. 2017, 21:100-107.
Liu et al., "Preparation of Modified Red Mud-Supported Fe Catalysts for Hydrogen Production by Catalytic Methane Decomposition," Article ID 8623463, Hindawi, Journal of Nanomaterials, 2017, 11 pages.
Liu et al., "Pyrolyzing ZIF-8 to N-doped porous carbon facilitated by iron and potassium for CO2 hydrogenation to value-added hydrocarbons," J. CO2 Util., May 2018, 25: 120-127.
Madadkhani, "Red Mud as an Iron-Based Catalyst for Catalytic Cracking of Naphthalene," a Thesis Submitted in Partial Fulfillment of the Requirements for the Degree of Master of Applied Science in the Faculty of Graduate and Postdoctoral Studies (Chemical and Biological Engineering), B.A. Sc., the University of British Columbia, Vancouver, Dec. 2016, 192 pages.
Meng et al., "Modeling of solid oxide electrolysis cell for carbon dioxide electrolysis," Chemical Engineering Journal, 2010, 164: 246-254, 9 pages.
Morrison, "Cis-trans Isomerization of Olefins by Intramolecular Energy Transfer," Journal of the American Chemical Society, Feb. 1965, 87(4): 932.
Naik et al. "Carbon Dioxide sequestration in cementitious products," Report No. CNU-2009-02, REP-640, College of Engineering, University of Wisconsin-Milwaukee, Jan. 2009 53 pages.
Nam et al., "Catalytic conversion of carbon dioxide into hydrocarbons over iron supported on alkali ion-exchanged Y-zeolite catalysts," Appl. Catal., A, Apr. 1999, 179(1-2): 155-163.
Nam et al., "Catalytic Conversion of Carbon dioxide into hyrdrocarbons over zinc promoted iron catalysts," Energy onvers. Manage., 1997, 38: S397-S402.
Ndlela et al., "Reducibility of Potassium-Promoted Iron Oxide under Hydrogen Conditions," Ind. Eng. Chem. Res., 2003, 42: 2112-2121.
Numpilai et al., "Pore size effects on physicochemical properties of Fe—Co/K-Al2O3 catalysts and their catalytic activity in CO2 hydrogenation to light olefins," Appl. Surf. Sci., Jul. 2019, 483, 581-592.
Pall.com (online), "Cyclo-Filter System," retrieved from URL <https://www.pall.com/en/oil-gas/midstream/midstream-black-powder.html>, retrieved on Jun. 16, 2020, available on or before 2020, 4 pages.
Pavlov et al., "Processes of Synthesis of 1-Butene from 2-Butene by the Positional Isomerization on Suffocation Exchangers," Russian Journal of Applied Chemistry, Jul. 2009, 82(6): 1117-1122, 6 pages.

(56) References Cited

OTHER PUBLICATIONS

Ramirez et al., "Metal Organic Framework-Derived Iron Catalysts for the Direct Hydrogenation of CO2 to Short Chain Olefins," ACS Catal., 2018, 8:9174-9182.
Researchandmarkets.com [online], "Global 1 Butene Demand—Supply and Price Analysis," 2002-2021, retrieved on Jan. 26, 2021, retrieved from URL <https://www.researchandmarkets.com/reports/3752113/global-l-butene-demand-supply-and-price-analysis>, 1 page.
Russkikh et al., "Red mud as an efficient catalyst in turning CO2 hydrogenation," Chemical Science Seminar, Oct. 13, 2019; KAUST, 2019, 1 page, Abstract only.
Shop.pall.com (online), "Black Powder Filter," retrieved from URL <https://shop.pall.com/us/en/search?SearchTerm=black+powder+fdter&resetsearch=true>, retrieved on Jun. 16, 2020, available on or before 2020, 7 pages.
Thach et al., "Further Improvements in Isomerization of Olefins in Solvent-free conditions," Journal of Synthetic Communications, Nov. 1992, 23:10 (1379-1384), 3 pages, Abstract only.
Van Beurden, "On the Catalytic Aspects of Stream-Methane Reforming: A Literature Survey," ECN-I--04-003, retrieved from URL <https://publicaties.ecn.nl/PdfFetch.aspx?nr=ECN-I--04-003>, Dec. 2004, 27 pages.
Visconti et al., "CO2 Hydrogenation to Lower Olefins on a High Surface Area K-Promoted Bulk FE-Catalyst," Appl. Catal., B 2017, 200, 530-542, 44 pages.
Wahyudi et al., "Utilization of Modified Red Mud as a Heterogeneous Base Catalyst for Transesterification of Canola Oil," Journal of Chemical Engineering of Japan, 2017, 50(7): 561-567, 8 pages.
Wang et al., "Fe-Cu Bimetallic Catalysts for Selective CO2 Hydrogenation to Olefin-rich C2+ Hydrocarbons," Ind. Eng. Chem. Res., Feb. 2018, 57(13): 4535-4542, 37 pages.
Wei et al., "New insights into the effect of sodium on Fe3O4- based nanocatalysts for CO2 hydrogenation to light olefins," Catal. Sci. Technol., 2016, 6(13): 4786-4793, 8 pages.
Yensen et al., "Open source all-iron battery for renewable energy storage," HardwareX 6 (2019) e00072, 2019, 11 pages.
You et al., "Hydrogenation of carbon dioxide to light olefins over non-supported iron catalyst," Chin. J. Catal., May 2013, 34(5): 956-963, 8 pages.

* cited by examiner

100

400

BLACK POWDER CATALYST FOR HYDROGEN PRODUCTION VIA DRY REFORMING

TECHNICAL FIELD

This disclosure relates to hydrogen production via dry reforming of hydrocarbon.

BACKGROUND

Hydrogen is commercially produced, such as from fossil fuels. Hydrogen may be produced, for example, through reforming of hydrocarbons or electrolysis of water. Hydrogen is produced by coal gasification, biomass gasification, water electrolysis, or the reforming or partial oxidation of natural gas or other hydrocarbons. The produced hydrogen can be a feedstock to chemical processes, such as ammonia production, aromatization, hydrodesulfurization, and the hydrogenation or hydrocracking of hydrocarbons. The produced hydrogen can be a feedstock to electrochemical processes, such as fuel cells.

Carbon dioxide is the primary greenhouse gas emitted through human activities. Carbon dioxide ($CO_2$) may be generated in various industrial and chemical plant facilities. At such facilities, the utilization of $CO_2$ as a feedstock may reduce $CO_2$ emissions at the facility and therefore decrease the $CO_2$ footprint of the facility. The conversion of the greenhouse gas $CO_2$ into value-added feedstocks or products may be beneficial. The reforming of hydrocarbon (e.g., methane) may utilize $CO_2$.

The reforming of natural gas is the most prevalent source of hydrogen production. Bulk hydrogen is typically produced by the steam reforming of natural gas (methane). Steam reforming includes heating the natural gas (e.g., to between 500° C. to 1100° C.) in the presence of steam. Conventional catalyst employed includes, for example, nickel, nickel alloys, or magnesium oxide (MgO). This endothermic reaction generates CO and H2.

SUMMARY

An aspect relates to a method of dry reforming hydrocarbon, including reacting the hydrocarbon with carbon dioxide via reforming catalyst to generate synthesis gas including hydrogen and carbon monoxide, wherein the reforming catalyst includes treated black powder having hematite.

Another aspect relates to a method of dry reforming hydrocarbon, including providing hydrocarbon and carbon dioxide to a dry reformer vessel, wherein reforming catalyst including treated black powder is disposed in the dry reformer vessel. The method includes dry reforming the hydrocarbon in the dry reformer vessel via the reforming catalyst to generate hydrogen and carbon monoxide, and discharging the hydrogen and carbon monoxide from the dry reformer vessel.

Yet another aspect relates to a method of preparing a reforming catalyst for dry reforming methane, including receiving black powder and applying heat to the black powder to give heat-treated black powder. The method includes applying heat to the heat-treated black powder in presence of air to give a calcined black powder for dry reforming of methane, wherein a majority of the calcined black powder is hematite.

Yet another aspect relates to a reforming catalyst including calcined black powder for dry reforming methane with carbon dioxide, wherein the calcined black powder is black powder (from a natural gas pipeline) heat treated at a temperature of at least 500° C. for at least 3 hours and calcined at a temperature of at least 775° C. in presence of air for at least 4 hours. A majority of the calcined black powder is hematite.

Yet another aspect is a dry reformer including a dry reformer vessel having at least one inlet to receive methane and carbon dioxide. The dry reformer vessel has a reforming catalyst including calcined black powder to convert the methane and the carbon dioxide into syngas. The dry reformer vessel has an outlet to discharge the syngas, wherein the syngas includes hydrogen and carbon monoxide.

The details of one or more implementations are set forth in the accompanying drawings and the description below. Other features and advantages will be apparent from the description and drawings, and from the claims.

DETAILED DESCRIPTION

Figure 1:
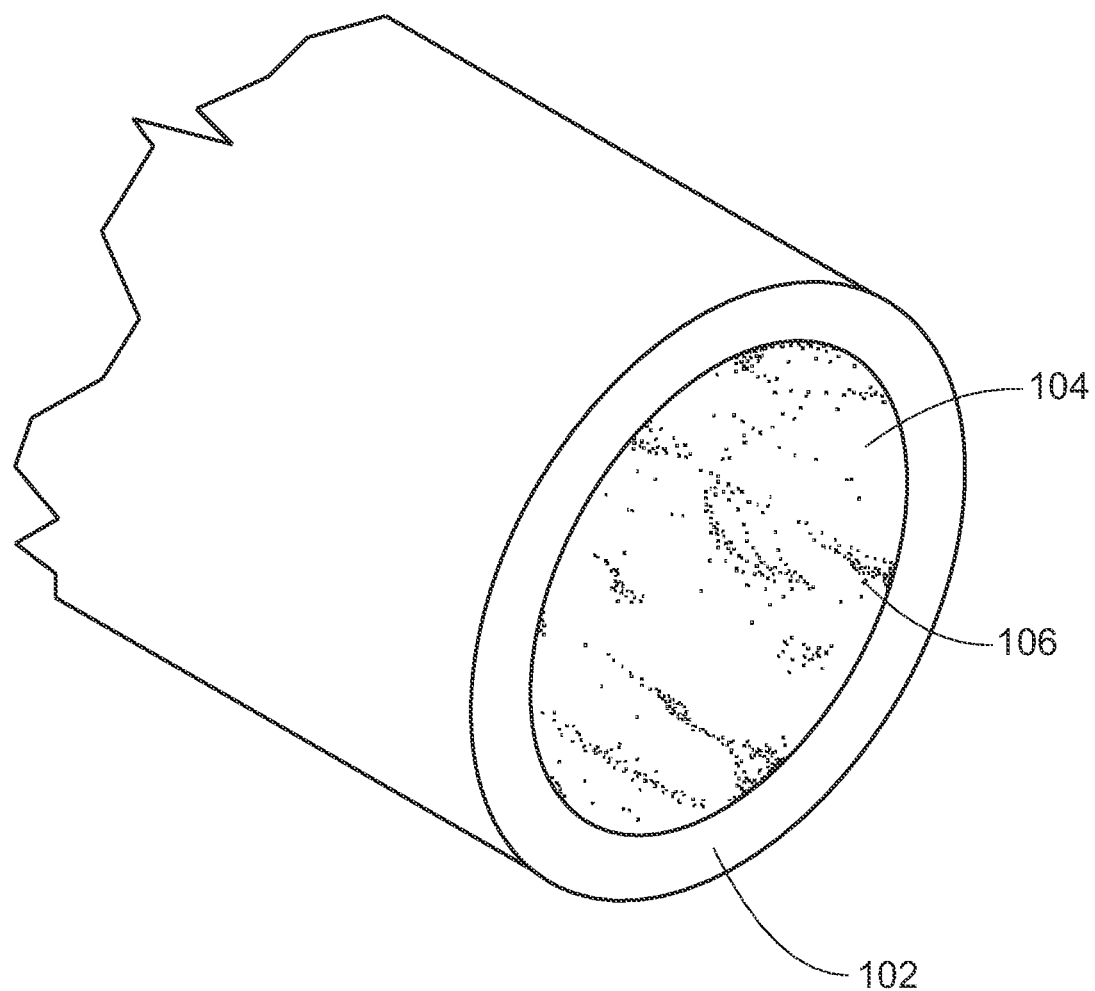
FIG. 1 is a diagram of a pipe having black powder.

Some aspects of the present disclosure are directed to collecting and processing black powder to give a catalyst (having hematite) that is utilized as reforming catalyst in dry reforming of methane. The catalyst is the processed black powder and thus may be labeled as a derivative of black powder. The processing of the black powder may include both heat treatment (e.g., at least 500° C.) and subsequent calcination (e.g., at least 775° C.). The treatment of the black powder gives the catalyst having Iron(III) oxide ($Fe_2O_3$) also known ferric oxide or hematite. This processing increases the amount of hematite ($Fe_2O_3$) in the black powder. Hematite ($Fe_2O_3$) is amphoteric and may be beneficial for catalysis in dry reforming of methane into syngas. Aspects of the present techniques relate to hydrogen production via dry reforming of hydrocarbon (e.g., methane) utilizing calcined black powder as the reforming catalyst.

Embodiments may heat treat and calcine black powder to give the treated black powder as having predominantly $Fe_2O_3$ (amphoteric). This treated (calcined) black powder may be employed as a dry reforming catalyst. The amphoteric (acidic basic) characteristic of the calcined black powder may provide basic sites for $CO_2$ disassociation as well as acidic sites for methane cracking. This may help in diminishing the need for adding or impregnating metals (precious or non-precious) that might be utilized with dry reforming catalysts. In addition, black powder as a waste in the oil and gas industry is beneficially utilized.

In general, black powder is a solid contaminant often found in hydrocarbon gas pipelines. Black powder is debris in natural-gas pipelines formed by corrosion of the pipeline, such as on the inner surface of inside diameter of the pipe. The black powder may be formed by corrosion of the internal surface of the pipeline wall. The term "black powder" describes regenerative debris formed inside natural gas pipelines due to corrosion of the internal wall of the pipeline. Black powder is generally regarded as a chronic nuisance that may be removed from the pipeline system, for example, by the use of a separator or cyclone. Black powder is considered a continuing problem as unwanted material removed from valuable process streams via filter bags, separators, or cyclones, and so on. The material may be wet, for example, having a tar-like appearance. The black powder be a very fine, dry powder. Black powder is primarily composed of iron oxides, silica and other metal carbonates, hydroxides, and sulfide iron carbonates. Black powder can include mill-like scale, such as hematite (Fe2O3) and magnetite (Fe3O4). Black powder is a waste present in the natural gas industry in relatively large amounts. Limited efforts have been exerted to utilize black powder, despite its availability in large amounts at almost no cost. The black powder can be collected from the pipelines, such as by a separator or from filters employed in upstream portions of gas refineries. Gas refineries may include natural gas processing plants or similar processing sites or facilities. The upstream filters (e.g., coreless filters) may be located before the gas processing plant (refineries) along the pipeline from the wellhead of the gas well (or oil and gas well). Also, these filters may be located at the inlet of gas processing plant refineries. The black powder may be collected from the filter units as the filter units are opened and cleaned, or collected as dumped nearby the filtration. In present embodiments, the black powder as retrieved may be transported to the treatment.

Black powder is primarily found in gas pipelines between the wellhead and the natural gas processing plant. Black powder may be generally absent from gas pipelines downstream of the natural gas processing plant because acid gas (hydrogen sulfide and carbon dioxide), mercury, water, and gas condensate will have generally been removed from the natural gas. The removal of these contaminants reduces occurrence of black powder downstream of the natural gas processing plant.

Dry reforming may be beneficial for consuming the two greenhouse gases methane (CH4) and carbon dioxide (CO2). Dry reforming is a process that may react CH4 with CO2 to produce synthesis gas (syngas) with the aid of catalyst. The syngas may include hydrogen (H2) and carbon monoxide (CO). The dry reforming reaction may be characterized as CH4+CO2→2H2+2CO. Dry reforming can be processed on certain metal catalysts. Noble catalysts, such as ruthenium (Ru), rhodium (Rh), and platinum (Pt), in dry reforming have demonstrated applicable catalytic actively, selectivity, stability, and low coking. However, the high cost of these metals may restrict their commercial application. The transition metal nickel (Ni) has shown acceptable results in dry reforming but is susceptible to sintering and deactivation. In contrast, as indicated, present embodiments provide for treated black powder as an effective dry-reforming catalyst.

Black powder as heat treated and calcined may be employed as a catalyst for dry reforming process because the black powder catalyst may primarily be Fe2O3, The Fe2O3 being amphoteric may promote contemporaneous CH4 cracking, CO2 disassociation, and oxidation of carbon species on the catalyst surface without the need to add or impregnate precious or non-precious metals nor the prerequisite to have specific basic sites on the catalyst substrate (support). Thus, calcined black powder may be beneficial as a catalyst for dry reforming because black powder as calcined in an air environment mainly consists (greater than 50 weight percent) of Fe2O3 (amphoteric) that can allow the simultaneous occurrence of CH4 cracking and CO2 dissociation in the dry reformer reactor. The black powder catalyst having primarily amphoteric Fe2O3 may allow such simultaneous occurrence without the need to add or impregnate metals (precious or non-precious) nor the need to have specific basic sites (e.g., mainly for CO2 disassociation) on the substrate of the catalyst. The term "amphoteric" may generally refer to a compound, such as a metal oxide or hydroxide, able to react both as a base and as an acid. The implementation of black powder catalyst in dry reforming may facilitate use of greenhouse gases CH4 and CO2, as well as waste material (black powder), to produce the valuable commodity syngas (CO and H2).

FIG. 1 is a pipe 100 (conduit) that may be piping or pipeline in a hydrocarbon gas (natural gas) system. The pipe 100 has a pipe wall 102 having a wall thickness. Black powder 104 is collected along the inner surface 106 of the pipe 100. The inner surface 106 is the internal surface of the inside diameter of the pipe 100. As indicated, black powder is regenerative and formed inside natural gas pipelines because of corrosion of the inner surface 106. Black powder forms through chemical reactions of iron (Fe) in ferrous pipeline steel with condensed water containing oxygen, CO2, and other gases. Black powder is mainly composed of iron hydroxides, iron oxides, and iron carbonates. The phrase "black powder" refers to the residue (material) that is formed along inner surface of pipelines as a natural waste product as a result of corrosion and includes metal oxide. Again, black powder can be collected from upstream filters employed in gas refineries. For many years, pipeline companies have observed the presence of black powder and its effects, but have viewed black powder generally only as an annoyance and therefore have done little to understand or use black powder. Instead, pipeline companies have primarily sought ways of removing the black powder from the pipelines. There are several approaches to remove the black powder, such as via separators and cyclones, where the black powder-laden gas passes through these devices and the black powder particles are physically knocked out of the gas stream. For instance, the black powder particles are removed from the gas stream and attach to the walls of the device (e.g., separator, cyclone) where they fall and are collected at the bottom in a collection media. Pipeline companies generally do not recognize a beneficial use for the black powder. Throughout the world, black powder from gas pipelines exists in large amounts, and is thus readily available at a very low cost due to its perceived lack of value. Black powder is typically discarded as waste. As mentioned, in many cases, black powder is regenerative debris that is formed inside natural gas pipelines as a result of corrosion of the internal walls of the pipeline. Black powder can also be collected from upstream filters or filter bags in gas refineries.

The typical major mineral composition of black powder without treatment is primarily iron oxide. The iron oxide includes magnetite (Fe3O4) and hematite (Fe2O3). The black powder also includes quartz (SiO2) and may include, metal carbonates, metal hydroxides, and sulfide iron carbonates. The Table below gives the elemental composition of a sample of example black powder "as is" (as collected) and also after the sample as "heat treated" (heat treatment at 500° C. for at least 3 hours). The heat treatment at 500° C. removes carbon associated with the metals, as indicated in the Table. The elements listed in the Table are carbon (C), oxygen (O), magnesium (Mg), silicon (Si), sulfur (S), chlorine (Cl), calcium (Ca), iron (Fe), and manganese (Mn). The composition is given in weight percent (wt %).

TABLE

Elemental Composition of Black Powder

| Element | *Black Powder "as is" (wt %) | **Black Powder "heat treated" (wt %) |
|---|---|---|
| C | 20.85 | 0 |
| O | 29.29 | 25.39 |
| Mg | 1.07 | 1.08 |
| Si | 0.41 | 0.48 |
| S | 1.88 | 2.63 |
| Cl | 2.10 | 1.53 |
| Ca | 1.23 | 1.88 |
| Fe | 43.06 | 65.7 |
| Mn | non-detectable | 1.32 |
| Total | 100 | 100 |

*as collected
**after subjected to 500° C. for at least 3 hours

The sample of the heat-treated black powder was then subjected to additional heat treatment that was air calcination at about 775° C. for at least 4 hours. The crystal of the resulted powder as analyzed x-ray diffraction (XRD) was mainly hematite ($Fe_2O_3$) as shown in the XRD spectra in FIG. 2.

Figure 2:
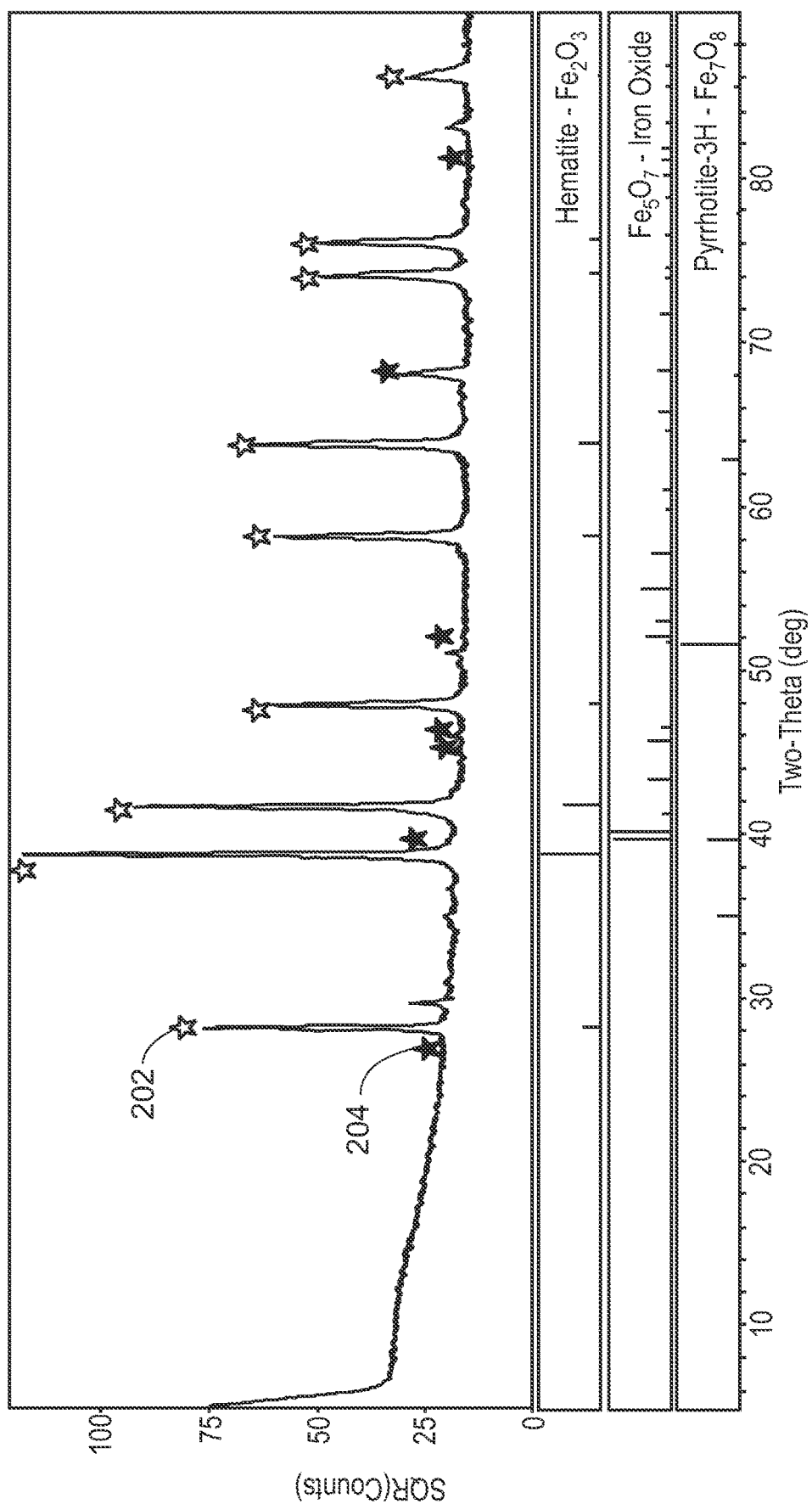
FIG. 2 is an x-ray diffraction (XRD) spectra of a sample of treated black powder.

FIG. 2 is XRD spectra 200 of a sample of the black powder after the black powder was (1) heat treated at 500° C. for 3 hours and (2) subjected to calcination in air at 775° C. for 4 hours. The scattering angle (or diffraction angle) is 2-theta in degrees. The spectra 200 indicates phase identification of black powder after being heat treated first at 500° C. for several hours (at least 3 hours) and then at 775° C. for at least 4 hours. The heat treatment at both temperatures was performed under air. The heat treatment at 500° C. removes carbon. The heat treatment at 775° C. can be characterized as calcination. The x-ray diffraction of the calcined powder sample resulted in a pattern characterized by reflections (peaks in intensity) at certain positions. The symbols 202 note the peaks for the primary mineral in the sample of calcined black powder, which is hematite. The symbols 204 note the peaks for the secondary mineral in the sample, which is iron oxide $Fe_5O_7$. The symbols 202 locate the spectra of hematite, which is the most intense peaks over the other iron form. The spectra 200 indicates that a majority of the calcined black-powder sample is hematite. In particular, the spectra 200 indicates that at least 80 wt % of the air-calcined black powder is hematite. Calcined black powder as described herein may have at least 50 wt % hematite, at least 60 wt % hematite, at least 70 wt % hematite, at least 80 wt % hematite, or at least 90 wt % hematite.

Black powder as collected from a natural gas pipeline system may have primarily magnetite and hematite. The black powder may be heat treated (e.g., at 500° C.) to remove carbon (including carbon deposition) from the black powder. This heat-treated black powder may be subjected to calcination (e.g., at 775° C.). For the calcination performed in an inert atmosphere, the calcination may drive formation of magnetite. In contrast, for the calcination performed in an air atmosphere, the calcination may drive formation of hematite. As for minerals in the air-calcined black powder, hematite may approach 100 wt %. As for the overall composition of the air-calcined black powder, the hematite is at least 50 wt % and can be at least 80 wt % or at least 90 wt %.

Figure 3:
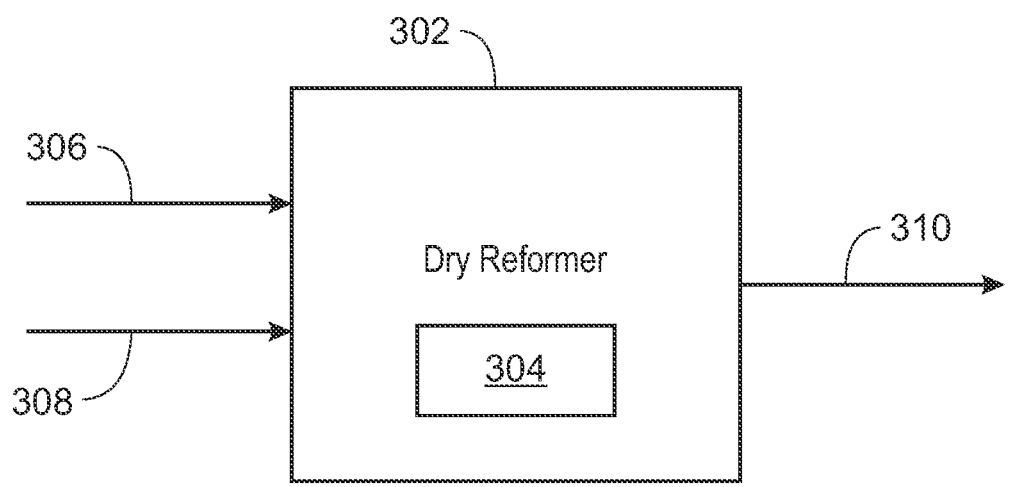
FIG. 3 is a diagram of a dry reformer for dry reforming hydrocarbon.

FIG. 3 is a dry reformer 300 (including a dry reformer vessel 302) to convert hydrocarbon (e.g., $CH_4$) in presence of $CO_2$ and reforming catalyst 304 into syngas. The dry reformer 300 may be a dry reformer system. The dry reformer 300 or dry reformer vessel 302 may be characterized as a dry reformer reactor or dry reformer reactor vessel, respectively, for the dry reforming of hydrocarbon (e.g., $CH_4$) to give syngas. A reforming catalyst 304 that is air-calcined black powder (e.g., see spectra 200 of FIG. 2), as discussed above, is disposed in the dry reformer vessel 302. The reforming catalyst 304 as calcined black powder may be black powder (e.g., collected from a natural-gas pipeline system) that is heat treated at a temperature of at least 500° C. for at least 3 hours and calcined at a temperature of at least 775° C. in presence of air for at least 4 hours. A majority of the calcined black powder is hematite. At least 50 wt % of the reforming catalyst 304 may be hematite.

The dry reformer 300 may be, for instance, a fixed-bed reactor or a fluidized bed reactor. The dry reformer vessel 302 may be a fixed-bed reactor vessel having the reforming catalyst 304 in a fixed bed. In implementations, the fixed-bed reactor vessel may be a multi-tubular fixed-bed reactor. The dry reformer vessel 302 may be a fluidized-bed reactor vessel that operates with a fluidized bed of the reforming catalyst 304.

The operating temperature of the dry reformer 300 (the operating temperature in the dry reformer vessel 302) may be, for example, in the ranges of 500° C. to 1100° C., 500° C. to 1000° C., 500° C. to 900° C., at least 500° C., less than 1000° C., or less than 900° C. The dry reforming reaction may generally be endothermic. The dry reformer vessel 302 (dry reformer reactor vessel) may have a jacket for heat transfer and temperature control. In operation, a heat transfer fluid (heating medium) may flow through the jacket for temperature control of the dry reformer 300 including the dry reformer vessel 302. Heat transfer may generally occur from the heat transfer fluid in the jacket to the dry reforming reaction mixture (process side of the dry reformer vessel 302). In other embodiments, electrical heaters may provide heat for the endothermic dry reforming reaction. The electrical heaters may be disposed in the dry reformer vessel 302 or on an external surface of the dry reformer vessel 302. In yet other embodiments, the dry reformer vessel 302 may be disposed in a furnace (e.g., a direct fired heater) to receive heat from the furnace for the dry reforming reaction and for temperature control of the dry reformer 300. Other configurations of heat transfer and temperature control of the dry reformer 300 are applicable.

The operating pressure in the dry reformer vessel 302 may be, for example, in the range of 1 bar to 28 bar, or less than 30 bar. In some implementations, the operating pressure may be greater than 30 bar to provide additional motive force for flow of the discharged syngas 310 to downstream processing. The downstream processing may include, for example, a Fischer-Tropsch (FT) system having a FT reactor vessel. The CO gas in the syngas 310 can be subjected to a water-gas shift reaction to obtain additional hydrogen.

In operation, the dry reformer vessel 302 may receive hydrocarbon 306 and carbon dioxide 308. While the hydrocarbon 306 and the carbon dioxide 308 are depicted as introduced separately into the dry reformer vessel 302, the hydrocarbon 306 and carbon dioxide 308 may be introduced together as combined feed to the dry reformer vessel 302. The hydrocarbon 306 may generally include $CH_4$. For example, the hydrocarbon 306 stream may be or include natural gas. In other examples, the hydrocarbon 306 includes $CH_4$ but is not a natural-gas stream. The hydrocarbon 306 may be a process stream or waste stream having CH4. The hydrocarbon 306 may include CH4, propane, butane, and hydrocarbons having a greater number of carbons. The hydrocarbon 306 may include a mixture of hydrocarbons (e.g., C1 to C5), liquefied petroleum gas (LPG), and so on. Additional implementations of the hydrocarbon 306 (e.g., having CH4) are applicable.

The dry reforming of the hydrocarbon 306 via the CO2 308 and reforming catalyst 304 may give syngas 310 having H2 and CO. The dry reforming reaction via the catalyst 304 in the dry reformer vessel 302 may be represented by $CH_4+CO_2 \rightarrow 2H_2+2CO$. The molar ratio of H2 to CO in the syngas 310 based on the ideal thermodynamic equilibrium is 1:1 but in practice can be different than 1:1. Unreacted CH4 may discharge in the syngas 310 stream. In some implementations, unreacted CH4 may be separated from the discharged syngas 310 and recycled to the dry reformer vessel 302. Moreover, the generated CO may be subjected to a water-gas shift reaction to obtain additional H2, as given by $CO+H_2O \leftrightarrows CO_2+H_2$. The water-gas shift reaction may be performed in the dry reformer vessel 302. The reforming catalyst 304 may promote the water-gas shift reaction if implemented. The water-gas shift reaction may instead be implemented downstream. The discharged syngas 310 may be processed to implement the water-gas shift reaction downstream of the dry reformer vessel 302. Utilization of the water-gas shift reaction, whether performed in the dry reformer vessel 302 or downstream of the dry reformer vessel 302, may be beneficial to increase the molar ratio of H2/CO in the syngas 310 for downstream processing of the syngas 310. The downstream processing may include, for example, an FT reactor or other processing. In certain implementations, the molar ratio of H2/CO may also be increased with the addition of supplemental H2 (e.g., from water electrolysis) to the discharged syngas 310.

The dry reformer 300 system includes feed conduits for the hydrocarbon 306 and the carbon dioxide 308, and a discharge conduit for the syngas 310. The dry reformer vessel 302 may be, for example, stainless steel. The dry reformer 302 vessel has one or more inlets to receive the feeds (e.g., 306, 308). The inlet(s) may be, for example, a nozzle having a flange or threaded (screwed) connection for coupling to a feed conduit conveying the feed to the dry reformer vessel 302. The vessel 302 may have an outlet (e.g., a nozzle with a flanged or screwed connection) for the discharge of produced syngas 310 through a discharge conduit for distribution or downstream processing. The flow rate (e.g., volumetric rate, mass rate, or molar rate) of the feed 306, 308 may be controlled via flow control valve(s) (disposed along respective supply conduits) or by a mechanical compressor, or a combination thereof. The ratio (e.g., molar, volumetric, or mass ratio) of the hydrocarbon 306 (e.g., CH4 or natural gas) to the carbon dioxide 308 may be adjusted by modulating (e.g., via one or more control valves) at least one of the flow rates of the hydrocarbon 306 or the CO2 308. Lastly, the present dry reforming may be a technique for conversion of CH4 and CO2 into syngas without the introduction of oxygen (O2) other than the less than 1 wt % that might be present as a residual or contaminant in the feed 306. Thus, embodiments of the dry reforming do not include autothermal reforming (ATR). Further, embodiments of the dry reforming do not include steam reforming. However, the present treated black powder can be applicable as a reforming catalyst for steam reforming and ATR.

An embodiment is a dry reformer including a dry reformer vessel. The dry reformer vessel has at least one inlet to receive hydrocarbon (e.g., including methane) and CO2. The dry reformer vessel has a reforming catalyst disposed in the vessel to convert the methane and CO2 into syngas. The reforming catalyst includes or is calcined black powder. The reforming catalyst having or as the calcined black powder may be at least 50 wt % hematite. The dry reformer vessel has an outlet to discharge the syngas, wherein the syngas includes H2 and CO. The dry reformer vessel may be a fixed-bed reactor vessel having the reforming catalyst in a fixed bed. If so, the fixed-bed reactor vessel may be a multi-tubular fixed-bed reactor. The dry reformer vessel may be a fluidized-bed reactor vessel to operate with a fluidized bed of the reforming catalyst.

Figure 4:
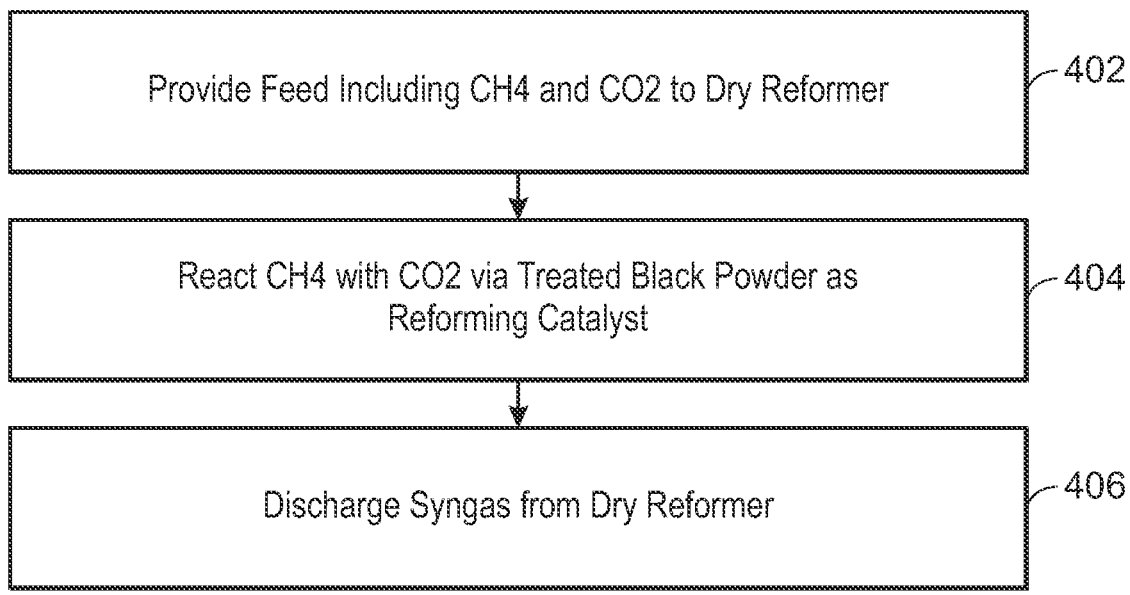
FIG. 4 is a block flow diagram of a method of dry reforming hydrocarbon.

FIG. 4 is a method 400 of dry reforming hydrocarbon. The hydrocarbon may include CH4 and can be or include natural gas. The hydrocarbon may be a process stream or waste stream having CH4. The hydrocarbon may include CH4, propane, butane, and hydrocarbons having a greater number of carbons.

At block 402, the method includes providing the hydrocarbon and CO2 to a dry reformer (e.g., to a dry reformer vessel). Reforming catalyst that is or includes treated black powder (processed black powder) is disposed in the dry reformer vessel. The treated black powder may be calcined black powder, as discussed. The reforming catalyst may be the present reforming catalyst as discussed above and as described in FIG. 5.

At block 404, the method include dry reforming the hydrocarbon in the dry reformer via the reforming catalyst to generate H2 and CO. The dry reforming involves reacting the hydrocarbon with the CO2 via the treated black powder as the reforming catalyst. The method may include providing heat to the dry reformer (e.g., to the dry reformer vessel) for the dry reforming, wherein the reacting of the hydrocarbon with the CO2 is endothermic. Heat may be provided by external electrical heaters residing on the surface of the dry reformer vessel. Heat may be provided by disposing the dry reformer vessel in a furnace. Other techniques for providing heat to the dry reformer are applicable.

The reforming catalyst having amphoteric hematite may beneficially provide in the dry reforming for both methane cracking and CO2 dissociation. The amphoteric tendency of hematite may allow for both the dissociation of CO2 and cracking of methane. Oxidation of carbon species on the catalyst surface may also be realized in the dry reforming (of methane) reaction. The hematite being amphoteric (able to react both as a base and as an acid) may aid or promote methane cracking, disassociation of CO2, and oxidation of carbon species on its surface.

At block 406, the method includes discharging the H2 and CO from the dry reformer (e.g., from the dry reformer vessel). The discharged stream having the H2 and CO may be labeled as syngas. The syngas may be sent to transportation or distribution. The syngas may be sent to downstream processing. In some embodiments, supplemental H2 may added to the syngas to increase the molar ratio of H2 to CO in the syngas. In certain embodiments, the water-gas shift reaction may be implemented in the dry reformer vessel or downstream of the dry reformer vessel to generate additional H2 to increase the molar ratio of H2 to CO in the syngas.

An embodiment is a method of dry reforming hydrocarbon, such as CH4. The method includes reacting the hydrocarbon with CO2 via reforming catalyst to generate syngas including H2 and CO. The reforming catalyst is or includes treated black powder that includes hematite. The hematite may be at least 50 wt % of the treated black powder. The treated black powder may be black powder from a natural gas pipeline and that is subjected to heat to give the treated black powder. The treated black powder may include black powder subjected to heat treatment at a temperature of at least 500° C. for at least 3 hours. The treated black powder may be black powder collected from a natural-gas pipeline system and that is subjected to heat in presence of air to give the treated black powder. The treated black powder may include calcined black powder. The treated black powder may include black powder subjected to heat treatment at a temperature of at least 775° C. in presence of air for at least 4 hours, and wherein this heat treatment includes air calcination of the black powder. The treated black powder may be or include collected black powder subjected to heat treatment at a temperature of at least 500° C. to remove carbon from the black powder and then subjected to air calcination at a temperature of at least 775° C. to give calcined black powder as the treated black powder.

Figure 5:
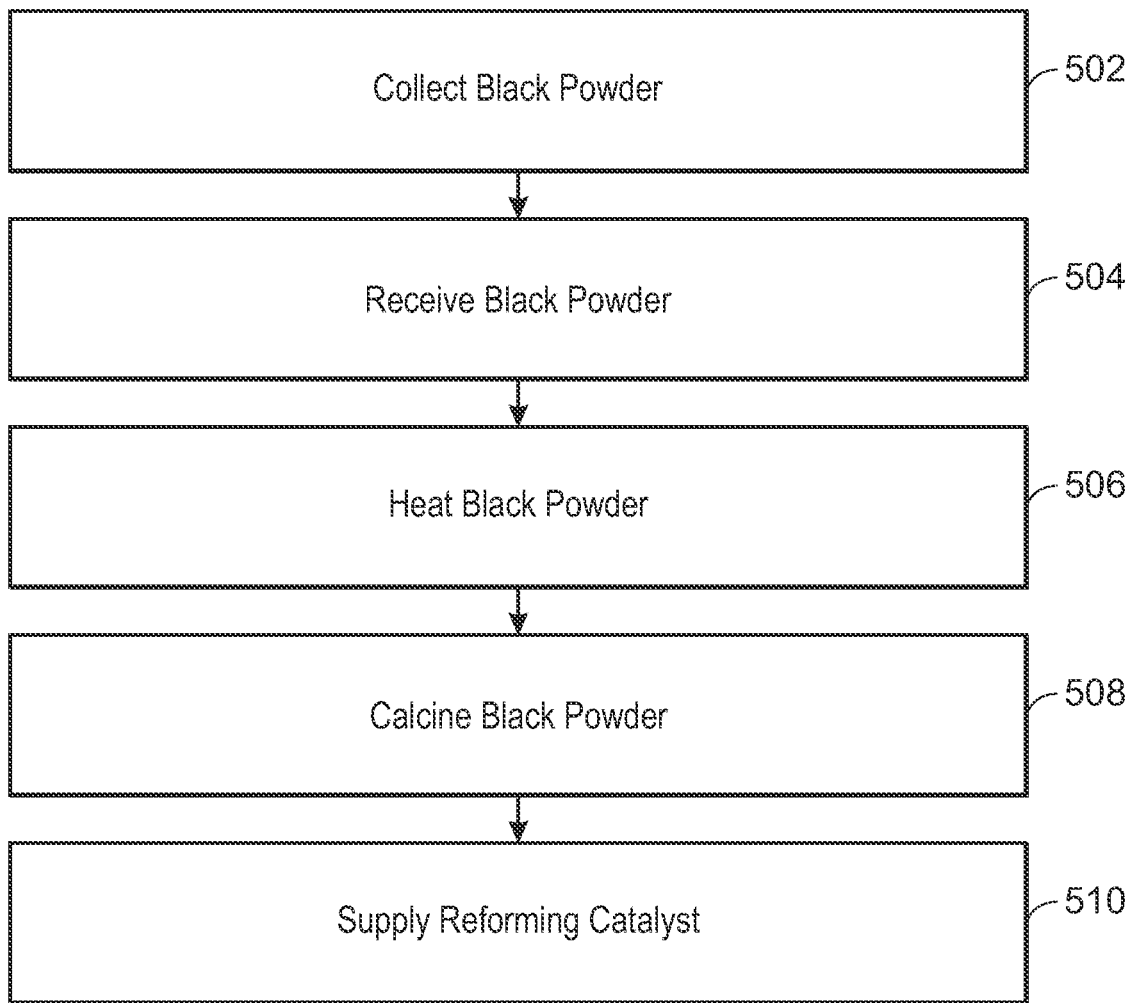
FIG. 5 is a block flow diagram of method of preparing a reforming catalyst for dry reforming hydrocarbon (e.g., $CH_4$).

FIG. 5 is a method 500 of preparing a reforming catalyst for dry reforming hydrocarbon (e.g., CH4). At block 502, the method includes collecting black powder. Black powder may be collected as discussed above. The black powder may be collected (removed) from a natural-gas pipeline system. The natural-gas pipeline system may include a natural gas pipeline(s) including piping, mechanical compressors, filters, separators, etc.

At block 504, the method includes receiving black powder. The black powder may be received at a location or facility to treat (e.g., heat treat, calcine, etc.) the black powder. The receiving of the black powder comprises may involve receiving the black powder collected from a natural-gas pipeline system.

At block 506, the method includes applying heat to the black powder to remove carbon (e.g., carbon deposition) from the black powder. The black powder received may be placed, for example, in an industrial oven (e.g., industrial-scale heat regenerator) to heat the black powder. The application of the heat may involve applying the heat at a temperature of at least 500° C. for at least 3 hours to remove the carbon from the black powder. The applying of heat to the black powder to remove carbon from the black powder gives a heat-treated black powder. This applying of heat for the Example below was applied in the laboratory with a typical oven that was a muffle furnace.

At block 508, the method includes calcining the black powder in presence of air to give calcined black powder as the reforming catalyst. The calcined black powder generally includes hematite. The calcining the black powder may involve calcining the heat-treated black powder (block 506) in the presence of air to give the calcined black powder as the reforming catalyst. The calcining may involve applying heat to the black powder in the presence of air at a temperature of at least 775° C. for at least 4 hours to give the calcined black powder as the reforming catalyst, wherein the hematite is at least 50 wt % of the calcined black powder. An example of equipment to subject the heat-treated black powder to calcination at about 775° C. or greater for at least four hours is a vessel in a furnace. In some implementations, the calciner is a steel cylinder having the black powder in an air atmosphere in the steel cylinder, and the steel cylinder rotates in a furnace to heat the black powder to about 775° C. or greater (in the air atmosphere inside the cylinder) for at least four hours. Calcination may be heating to high temperatures in air or oxygen. Calcination may be referred to as "firing" or "fired." Calcining may remove unwanted volatiles from a material and convert a material into a more stable, durable, or harder state. In present embodiments, example conditions of the calcination include calcining the black powder in air at a temperature in a range of 700° C. to 800° C. for at least 4 hours. The main compound (e.g., up to 90 wt %, or at least 90 wt %) of the air-calcined black powder may be Fe2O3. The remainder of the air-calcined black powder may include small amounts or trace elements of other oxides, such as other iron oxides or silicon oxide (SiO2). In some implementations, SiO2 may dominate the remainder of air-calcined black powder. The mineral SiO2 is not listed on FIG. 2 because SiO2 was below the detection limit of the used XRD device. However, the SiO2 present in the FIG. 2 sample was detected by x-ray fluorescence (XRF) analysis.

At block 510, the method includes supplying the calcined black powder formed in block 508 as the reforming catalyst for dry reforming of methane. The calcined powder may be removed from the calcination equipment (e.g., vessel) and transported to a facility that dry reforms methane. The calcined black powder as reforming catalyst may be placed into a dry-reformer reactor vessel.

An embodiment is of preparing a reforming catalyst for dry reforming methane. The method includes receiving black powder and applying heat to the black powder to give heat-treated black powder. The applying of heat to the black powder may involve applying the heat at a temperature of at least 500° C. to give the heat-treated black powder. The method includes applying heat to the heat-treated black powder in presence of air to give a calcined black powder, wherein a majority of the calcined black powder is hematite. The applying of heat to the heat-treated black powder may involve applying the heat to the heat-treated black powder at a temperature of at least 775° C. in the presence of air to give the calcined black powder. The reforming catalyst may be or include the calcined black powder.

Example

In the laboratory, the performance of the present heat-treated/calcined black powder (primarily hematite) to generate hydrogen in dry reforming of methane was compared to performance of a conventional reforming catalyst having the universal basic catalyst substrate of MgO to generate hydrogen in dry reforming of methane. The MgO is both a support and the active catalyst. The dry reforming performance of the present treated black powder versus the dry reforming performance of the conventional MgO were compared at the same conditions of dry reforming. The dry reforming conditions included 750° C., 14 bar, and a gas hour space velocity (GHSV) of 1477 $h^{-1}$.

Figure 6:
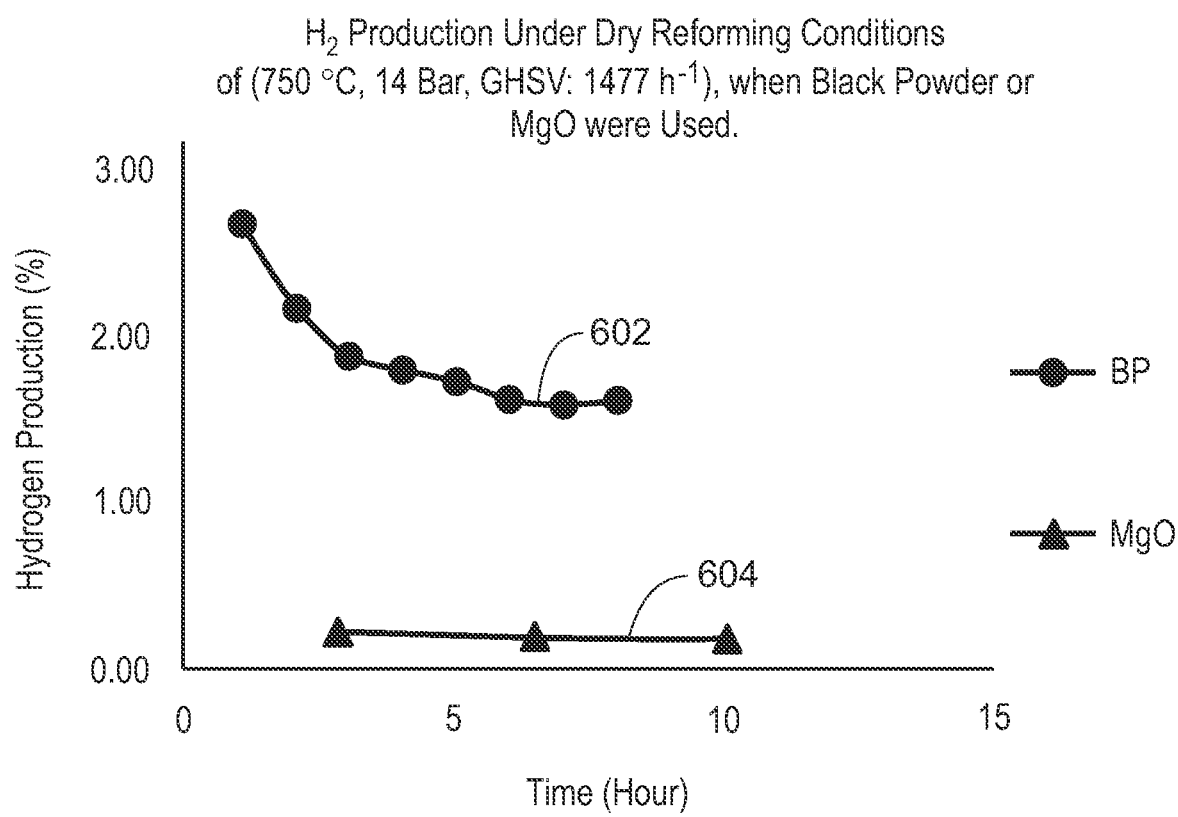
FIG. 6 is a plot of the percent of H2 in effluent over time for the Example.

FIG. 6 depicts results of the Example comparison, which show a better performance by the heat-treated/calcined black powder having primarily Fe2O3 (amphoteric) as compared to the non-amphoteric (solely basic) MgO. FIG. 6 is a plot of the percent (mol %) of H2 in the effluent over time (hours). The time was the experiment time of the dry reforming in the laboratory. The curve 602 is the mol % H2 in the effluent with the dry reforming catalyst as the heat-treated/calcined black powder. The curve 604 is the mol % H2 in the effluent with the dry reforming catalyst as the MgO.

The dry reforming in the Example laboratory evaluation was performed in a Microactivity Effi microreactor (compact reactor) system available from PID Eng & Tech (Madrid, Spain) having Micromeritics Instrument Corp. as parent corporation. The microreactor is configured for operation at pressures up to 100 bars. In the Example, 3 milliliters (ml) of the prepared black powder was loaded on the microreactor with a diameter of 9 millimeter (mm)

Hastelloy tube and placed inside an electrical furnace. The prepared black powder (FIG. 2) was the black powder subjected to heat at 500° C. for 3 hours and then calcined at 775° C. for 4 hours. In the electrical furnace, the prepared black powder was reduced with H2 and nitrogen (N2) at 750° C. for 6 hours before the reforming reaction was started. This reduction of the catalyst may make the catalyst more active for the dry reforming reaction. Then, a mixture of CH4, CO2, and N2 were fed to the microreactor. The feed molar ratio of CH4 to CO2 was 1. The N2 was fed into the microreactor in order to give the GHSV of 1477 $h^{-1}$. The treated black-powder catalyst was gradually pressurized and tested at 14 bar and 750° C. while feeding the mixture of CH4, CO2, and N2. The same was performed for the MgO (3 ml) catalyst support at the same conditions as well. Testing for each was performed for about 6 hours. The produced gas was analyzed by the gas chromatography (GC, Agilent 7890B) equipped with a thermal conductivity detector (TCD) and a flame ionization detector (FID). Before analysis, water in the gas was removed with a liquid/gas separator and a moisture trap. The concentrations of H2 were determined with the TCD. The mol composition from the GC was converted quantitatively based on the amount of N2 in the produced gas.

The Fe2O3 has an amphoteric characteristic (acidic-basic), which may trigger its use as a catalyst in dry reforming. Because the Fe2O3 can provide basic sites for CO2 dissociation as well as acidic sites for methane cracking, the need for adding or impregnating precious or non-precious metal typically utilized with dry reforming catalyst may be avoided in present implementations. Behavior of different support types of reforming catalysts in the dry reforming of methane into syngas may be compared. Amphoteric support catalysts, such as catalyst that is Fe2O3 or the present treated (processed) black powder having primarily Fe2O3, the catalyst may provide for (allows) CH4 cracking and CO2 dissociation that may occur contemporaneously or simultaneously in the dry reforming. In contrast, acidic support catalysts (e.g., silicon oxide or SiO2) may provide for (allow) CH4 cracking but generally not CO2 dissociation in the dry reforming. Basic support catalysts (e.g., MgO) may provide for (allows) CO2 dissociation but generally not CH4 cracking in the dry reforming. Iron groups consisting of Ni, Co, and Fe possess a high activity toward hydrocarbon cracking, with Fe being the lowest activity among the group. However, the Fe2O3 being amphoteric may avoid the need to add or impregnate precious or non-precious metals to the catalyst. The air-calcined black powder as a catalyst for dry reforming process may be advantageous because it mainly consists of the amphoteric (acidic and basic) Fe2O3, which may generally allow for the simultaneous occurrence of methane cracking and CO2 dissociation without the need to add/impregnate precious or non-precious metals nor the need to have specific basic sites on the substrate.

An embodiment is a reforming catalyst for dry reforming CH4 with CO2. The reforming catalyst includes or is calcined black powder that is black powder heat treated at a temperature of at least 500° C. for at least 3 hours and calcined at a temperature of at least 775° C. in presence of air for at least 4 hours. The black powder is from a natural gas pipeline. A majority of the calcined black powder is hematite. The hematite may be both a support and active portion of the reforming catalyst. The hematite being amphoteric may advance cracking of the CH4 and dissociation of the CO2.

Another embodiment is a reforming catalyst for dry reforming CH4 with CO2. The reforming catalyst has at least 70 wt % (or at least 80 wt %) of hematite. The hematite is both a support and catalytic active portion of the reforming catalyst. The hematite being amphoteric advances both cracking of the CH4 and dissociation of the CO2 in dry reforming of the methane. The reforming catalyst may be or include calcined black powder having the hematite. The calcined black powder is black powder heat treated at a temperature of at least 500° C. for at least 3 hours and calcined at a temperature of at least 775° C. in presence of air for at least 4 hours. The black powder is from a natural gas pipeline.

A number of implementations have been described. Nevertheless, it will be understood that various modifications may be made without departing from the spirit and scope of the disclosure.

What is claimed is:

1. A method of dry reforming hydrocarbon, comprising:
receiving a black powder collected from a natural-gas pipeline system and that formed on an inside surface of a natural gas pipeline of the natural-gas pipeline system, the black powder comprising magnetite and hematite;
reacting hydrocarbon comprising methane with carbon dioxide via reforming catalyst at a temperature in a range of 500° C. to 1100° C. and at a pressure in a range of 1 bar to 28 bar to generate synthesis gas comprising hydrogen and carbon monoxide, wherein the reforming catalyst comprises a treated black powder comprising at least 50 weight percent of hematite, wherein the treated black powder comprises the black powder subjected to heat treatment at a temperature of at least 500° C. to remove carbon from the black powder and then subjected to air calcination at a temperature of at least 775° C. to give calcined black powder as the treated black powder.

2. The method of claim 1, wherein reacting the hydrocarbon comprising methane with carbon dioxide to generate synthesis gas is dry reforming, and wherein the dry reforming is performed without introduction of oxygen ($O_2$).

3. The method of claim 1, wherein the natural gas pipeline is between a wellhead and a natural gas processing plant.

4. The method of claim 1, comprising collecting the black powder from the natural-gas pipeline system, wherein the air calcination comprises calcination in presence of air to give the treated black powder.

5. The method of claim 1, wherein the black powder collected from the natural-gas pipeline system comprises black powder collected via a filter disposed along the natural gas pipeline downstream of a wellhead.

6. The method of claim 5, wherein the filter is disposed along the natural gas pipeline between the wellhead and a gas processing plant or in an upstream portion of the gas processing plant.

7. The method of claim 6, wherein the black powder is collected via the filter by opening and cleaning the filter or by collecting the black powder as dumped adjacent to the filter.

8. The method of claim 1, comprising collecting the black powder from the natural-gas pipeline system via a filter, a filter bag, a separator, or a cyclone, or any combinations thereof, wherein the reforming catalyst does not comprise nickel (Ni).

9. A method of dry reforming hydrocarbon, comprising:
receiving a black powder collected from a natural-gas pipeline system and that formed on an inside surface of a natural gas pipeline of the natural-gas pipeline system, the black powder comprising magnetite and hematite;
providing hydrocarbon and carbon dioxide to a dry reformer vessel, wherein the hydrocarbon comprises methane, wherein reforming catalyst comprising a treated black powder having at least 50 weight percent of hematite is disposed in the dry reformer vessel, wherein the treated black powder comprises the black powder subjected to heat treatment at a temperature of at least 500° C. to remove carbon from the black powder and then subjected to air calcination at a temperature of at least 775° C. to give calcined black powder as the treated black powder;
dry reforming the hydrocarbon in the dry reformer vessel via the reforming catalyst at a temperature in a range of 500° C. to 1100° C. and at a pressure in a range of 1 bar to 28 bar to generate hydrogen and carbon monoxide; and
discharging the hydrogen and carbon monoxide from the dry reformer vessel.

10. The method of claim 9, comprising collecting the black powder from the natural-gas pipeline system via a filter, a filter bag, a separator, or a cyclone, or any combinations thereof, wherein the dry reforming comprises reacting the hydrocarbon with the carbon dioxide, and wherein the reforming catalyst does not comprise nickel (Ni).

11. The method of claim 9, comprising providing heat to the dry reformer vessel for the dry reforming comprising reacting of the hydrocarbon with the carbon dioxide, wherein the reacting of the hydrocarbon with the carbon dioxide is endothermic, and wherein oxygen ($O_2$) is not introduced to the dry reformer vessel for the dry reforming.

* * * * *